United States Patent [19]
Steininger

[11] Patent Number: 4,966,675
[45] Date of Patent: Oct. 30, 1990

[54] POLARIZABLE ELECTRODE

[76] Inventor: Karl-Heinz Steininger, Otto Lowei Gasse 8, A-8042 Graz, Austria

[21] Appl. No.: 324,369

[22] Filed: Mar. 15, 1989

[30] Foreign Application Priority Data

Mar. 15, 1988 [AT] Austria ................................. 703/88

[51] Int. Cl.$^5$ ............................................. C25B 11/04
[52] U.S. Cl. ................................ 204/290 R; 204/291; 204/294; 429/42; 429/44
[58] Field of Search ................... 204/290 R, 291, 294; 429/42, 44

[56] References Cited

U.S. PATENT DOCUMENTS

| | | | |
|---|---|---|---|
| 3,193,412 | 7/1965 | Salkind et al. | 136/6 |
| 3,423,247 | 1/1969 | Darland et al. | 136/120 |
| 3,629,007 | 12/1971 | Kilduff | 136/26 |
| 4,135,039 | 1/1979 | Jenkins | 429/27 |
| 4,237,195 | 12/1980 | Alfenaar | 429/44 |

FOREIGN PATENT DOCUMENTS

| | | |
|---|---|---|
| 0280427 | 8/1988 | European Pat. Off. . |
| 59-215668 | 12/1984 | Japan . |
| 61-284059 | 12/1986 | Japan . |
| 200363 | 1/1979 | United Kingdom . |

Primary Examiner—John F. Niebling
Assistant Examiner—Kathryn Gorgos
Attorney, Agent, or Firm—Herbert Dubno

[57] ABSTRACT

The polarizable electrode in an electrolyte comprises an electrically conductive conductor, advantageously metal or carbon, which is surrounded by an inner layer made of an electrically conductive plastic, which has a high stability to action by the electrolyte and does not lose its closed structure on insertion of the electrode so that protection of the electrically highly conductive conductor against electrochemical or chemical action is guaranteed. The inner layer is enclosed by an outer layer made of electrically conductive plastic, which loses its closed structure by the electrochemical processes occurring and which expands to a large volume so that the active working surface of the electrode is increased by the desired porosity.

13 Claims, 2 Drawing Sheets

POLARIZABLE ELECTRODE

FIELD OF THE INVENTION

My present invention relates to a polarizable electrode in an electrolyte, which comprises a highly electrically conductive conductor, advantageously of metal or carbon, which is covered by an electrically conductive plastic.

BACKGROUND OF THE INVENTION

Polarizable electrodes of the above-described type have been used in electrochemical processes, especially for chemical synthesis, electrolysis, in galvanic cells for energy storage, as sensors and as corrosion preventors.

In the use of an electrode, there is a requirement that the electrode have a minimum current density (of current transferred to the electrolyte) and a certain minimum service life. This value is given in $mA/cm^2$. Furthermore, a total delivered-current density whose value is given in $mAh/cm^2$, over this certain predetermined lifetime is required.

These values are determined by selection of suitable materials for use in a certain electrolyte. Naturally, the material costs play a substantial role. To reduce these costs currently for many applications, one turns to electrodes which comprise a highly conductive electrical conductor, advantageously made of metal or carbon, which is covered by a polymer which was made electrically conductive by the addition of conductive additives.

Since this kind of electrode has, for most applications, a electrically conductive plastic of insufficient activity to guarantee the required minimal exchange current density, the active surface of the electrically conductive plastic sheath has had to be improved by suitable treatment, including roughening or application of an additional active layer, which includes a binding agent in minimal proportions and an electrically conductive component in comparatively larger proportions, which guarantees an increase of the surface activity of the electrode. Truly satisfactory results have generally not been obtainable with this known electrode.

OBJECT OF THE INVENTION

It is an object of my invention to provide a stable high-activity electrode for electrochemical use which guarantees the required minimal exchange current density during the entire predetermined service life at comparatively low cost.

Another object is to overcome the drawbacks mentioned previously without materially increasing the cost of the electrode.

SUMMARY OF THE INVENTION

These objects and others which will become more readily apparent hereinafter are attained in accordance with my invention in an electrode polarizable in an electrolyte for an electrochemical process and having an electrically conductive plastic cover which comprises at least two different layers. The inner layer directly adjacent the conductor is made of an electrically conductive plastic having a higher stability (resistance) to the electrolyte, and the outer layer adjacent the electrolyte is made of another electrically conductive plastic which experiences a structural change by action of the electrolyte. This structural change advantageously results in an increase in porosity, surface area and volume.

In this type of electrode, the inner layer does not lose its closed and core-encapsulating structure either electrochemically or chemically and thus, guarantees protection of the highly conductive electrical conductor against electrochemical or chemical attack. However, the outer layer does lose its closed structure by the chemical and electrochemical processes occurring on its surface and expands in volume. The porosity of this outer layer is increased. Hence, the effective surface of the electrode increases and an increased electrochemical change on the electrode is effected.

The electrode according to my invention can have, as described, two layers on the conductive (metal or carbon) core, an inner layer and an outer layer. However, an additional layer made of an electrically conductive plastic can be provided between the outer and the inner layer.

The electrode formed according to my invention is particularly suited for use in electrochemical or electrokinetic processes, like electrolysis, electrophoresis and electroosmosis and as a sensor and as a corrosion protector for metals.

The electrode according to my invention is polarizable for the voltage necessary for each use, even voltages beyond the theoretical electrolysis voltage of 1.23 volts or a multiple of this voltage.

The conductive inner layer applied directly to the conductive carbon or metal layer predominantly for protection can comprise a nonpolar electrically conductive plastic which, however, can be mixed with a minor quantity of a polar electrically conductive plastic. In contrast, the outer or active layer advantageously can be at least predominantly a polar synthetic resin material, which can, however, also be mixed with a minor proportion of nonpolar synthetic resin material.

The inner layer advantageously can be composed, at least partially, of polyethylene, polypropylene or mixtures thereof.

The electrically conductive outer layer preferably can be at least partially ethylenevinylacetate, hard or soft polyvinyl chloride, acrylonitrile-butadiene-styrene-terpolymer, chlorinated polyethylene, polyurethane, nitrile rubber, styrene-butadiene rubber, halogen elastomers or a mixture thereof.

The additives by which the electrical conductivity of the synthetic resin material forming the layers is attained are selected so that they are stable to oxidative degradation and intercalation by anions. Thus, their conductivity remains constant during electrolysis conditions.

Metal particles can be used as such additives; however, the use of such metal components is not suitable because of their high cost. Advantageously carbon black, graphite powder, carbon fibers, graphite fibers or mixtures thereof are mixed with the synthetic resin material forming both layers. However, an intrinsically conductive polymer can also be used as such an additive.

The composition of the layers should be such that they contain enough poorly conducting or nonconducting material that each of both layers have a specific resistance of between 1 and 1000 Ohm/cm. The above additives should be present in between 5 and 70 Vol. %, advantageously about 20 Vol. %, in the polymer forming the layers for this purpose.

The highly conductive electrical conductor, advantageously made of metal or carbon, can have a circular cross section. It can, however, also be made from a flat body, for example, screen, particularly a metal mesh screen, expanded metal, or a net, so that its contact-making surface is as large as possible. The cross section of the conductor is selected to meet the requirements for the current amplitude used.

The electrode can be simply made by covering the electrically highly-conductive conductor in an extrusion process, in an injection molding process or by hot pressing when both layers are made of electrically conductive plastic. A conventional plastic processing machine can then be used for making the electrode. The mixed and homogenized filled polymer mass can be granulated as an intermediate product or processed directly in a molding process.

The optimum results are obtained then when the thickness of each of the layers lies between 0.2 and 5 mm.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
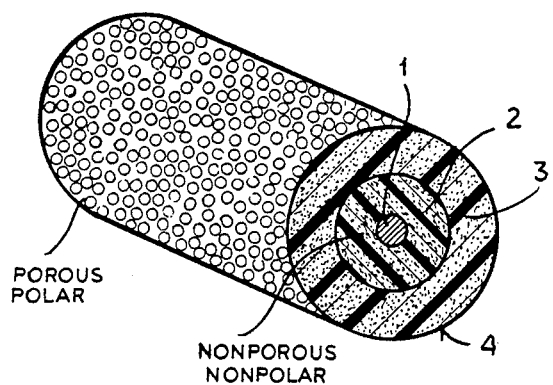
FIG. 1 is a perspective view of a cylindrical electrode according to my invention with a highly electrically conductive core conductor with a circular cross section.

The electrode according to my invention comprises a highly conductive electrical conductor 1 which is made of metal or carbon, which is covered by an inner layer 2 made of an electrically conductive plastic and by an outer layer 3 made of another electrically conductive plastic. Carbon black, graphite, carbon fibers, graphite fibers or a mixture thereof are mixed with the polymers to obtain the desired electrical conductivity in both plastic layers 2, 3. A mixture of intrinsically conductive polymers can also be used.

The inner layer 2, which covers the highly conductive electric conductor 1, comprises preponderantly a nonpolar electrically conductive plastic which does not lose its compact dense structure as a result of the electrode processes and thus guarantees protection of the highly conductive electrical conductor encapsulated thereby from electrochemical or chemical influences. Nevertheless, the required electrical connection between the highly conductive conductor 1 and the outer layer 3 is guaranteed by the conductivity of the inner layer 2.

This outer layer 3 in contrast comprises a preponderantly polar electrically conductive plastic whose nature is such that it loses its closed structure during the electrode processes occurring at the electrode surface 4 and expands or swells to a greater volume. This is effected in such a way that the porosity arising increases the effective outer and inner surface and hence, the electrochemical conversion at the electrodes is augmented.

Figure 2:
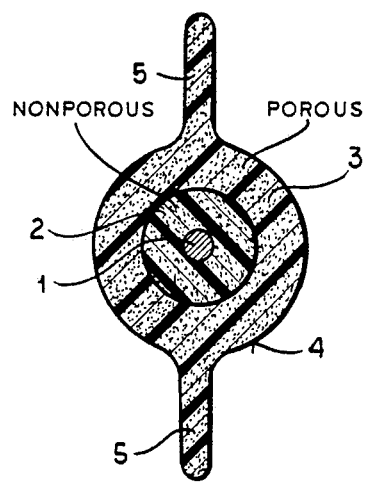
FIG. 2 is a cross sectional view through another embodiment of a cylindrical electrode according to my invention with increased working surface.

The embodiment in FIG. 2 differs from the embodiment of FIG. 1 in that the outer layer 3 is provided with protruding wings 5 so that the effective or active area is increased.

Figure 3:
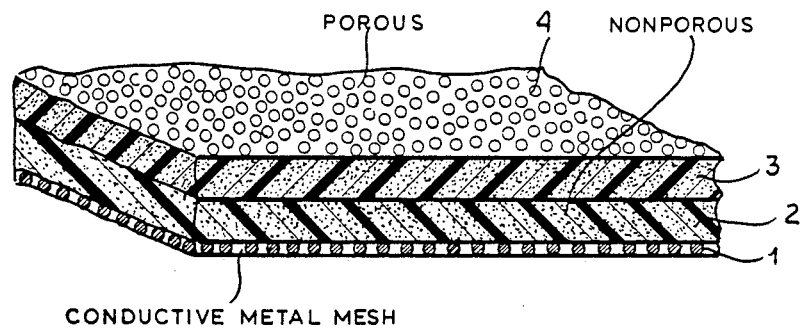
FIG. 3 is a perspective view of a portion of a platelike electrode according to my invention in which the highly conductive electric conductor is only covered on one of its sides by electrically conductive plastic.
Figure 4:
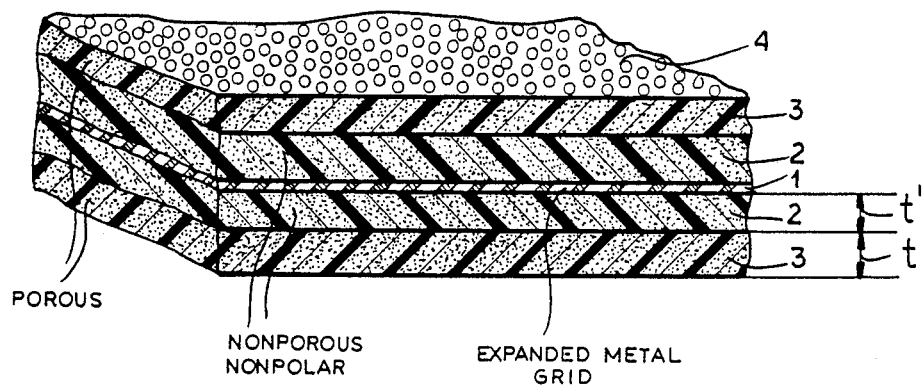
FIG. 4 is a perspective view of a similar to FIG. 3 platelike electrode according to my invention in which the highly conductive electric conductor is covered by electrically conductive plastic on both sides.

FIG. 3 shows a platelike electrode in which the highly conductive conductor 1 made from a substantially flat body, advantageously a screen or a net, is provided only on one side with both layers 2, 3 as described above. As shown in FIG. 4, the substantially flat body 1 can be an expanded metal grid.

In the embodiment shown in FIG. 4 the highly conductive conductor 1 made from a flat expanded metal (e.g. copper) is covered on both sides with layers 2, 3 and thus, as in the embodiment according to FIGS. 1 and 2 is completely covered.

Figure 5:
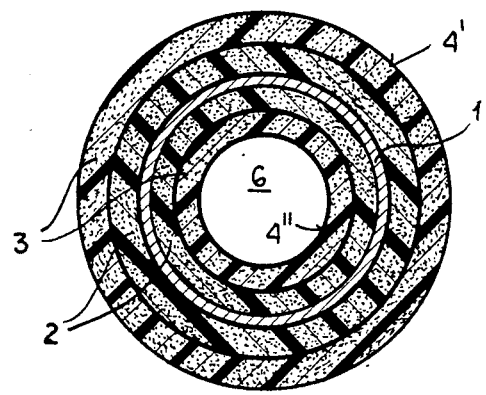
FIG. 5 is a cross sectional view through a cylindrical hollow electrode in which the highly conductive electric conductor is covered on both sides with an electrically conductive plastic.

FIG. 5 shows an embodiment comprising a cylindrical hollow electrode. The cylindrical hollow highly conductive electric conductor I is covered on both sides by cylindrical layers 2, 3 from a highly electrically conductive plastic and thus, similarly is completely and identically covered on all sides. The electrolyte not only surrounds the outer surface 4' but also flows through the hollow space 6 and rests also on the inner surface 4''.

Consequently a standard electrode may be compared with the electrode according to the invention as to the various important values. A stability test for the electrode was made under galvanostatic conditions (direct current density at 1 mA/cm$_2$) in a NaCl electrolyte (5%). After about 50 hours of operation, a current-voltage curve with and without compensation of ohmic voltage drop was taken.

To make the electrode according to my invention an ethylene-vinyl acetate copolymer with 25% carbon black was mixed, plasticized and granulated in an extruder to form the outer layer.

The inner layer was granulated similar to the outer layer in an extruder and made from a mixture of low pressure polyethylene and carbon black.

Subsequently, the inner layer was continuously extruded about the highly conductive core conductor made of copper to a uniform layer thickness t' of 1.5 mm. In a second working process step, the outer layer was extruded to a thickness t of 2 mm on the inner layer.

For control purposes, layered control electrodes of the same shape were made. The first control electrode had a copper core conductor which was covered with a single layer of an electrically conductive plastic corresponding to the electrically conductive plastic of the outer layer of the electrode according to my invention. The second control electrode was formed with a layer in the same way as that for the electrically conductive plastic which corresponded to that used for forming the inner layer of the electrode according to my invention.

The control electrodes were dipped as loops in an electrolyte, contacted on ends thereof and tested in the above-described way. Ri = internal resistance. Reference electrode = Ag/AgCl.

The test results are shown in following tables:

| ELECTRODE ACCORDING TO MY INVENTION | | | |
|---|---|---|---|
| | Sum, mAh/ cm$^2$ | Voltage relative to reference Electrode, volts | Ri Ohm Observations |
| 1 | 0 | 5.5 | 600 optically unchanged |
| 2 | 100 | 3.8 | 320 lightly rough surface |
| 3 | 200 | 3.2 | 270 swelling and increased roughness of active layer |
| 4 | 300 | 3.2 | 275 same as 3 |
| 5 | 400 | 3.2 | 280 increased swelling Volume uptake 2x |
| 6 | 500 | 3.3 | 280 same as 5 |
| 7 | 600 | 3.3 | 280 same as 5 |
| 8 | 700 | 3.3 | 290 same as 5 |
| 9 | 800 | 3.5 | 310 same as 5 |
| 10 | 900 | 4.0 | 390 small amount of Cu in solution |
| 11 | 1000 | 6.2 | 580 conductor decomposition |

The electrode according to my invention was connected as the anode. A cathode of the same construction shows no noteworthy changes in its appearance of its properties over the entire duration of the experiment.

The following table contains the comparative test results for a first standard or control electrode:

| | Sum, mAh/ cm$^2$ | Voltage relative to reference Electrode, volts | Ri Ohm Observations |
|---|---|---|---|
| 1 | 0 | 5.4 | 590 optically unchanged |
| 2 | 100 | 3.9 | 330 lightly rough surface |
| 3 | 200 | 3.3 | 280 swelling and increased roughness of active layer |
| 4 | 300 | 3.2 | 275 same as 3 |
| 5 | 400 | 5.0 | 490 slight loss of Cu in solution |
| 6 | 500 | 7.9 | 800 Conductor decomposition Ends Experiment |

The results for the second electrode are as follows:

| | Sum, mAh/ cm$^2$ | Voltage relative to reference Electrode, volts | Ri Ohm Observations |
|---|---|---|---|
| 1 | 0 | 5.6 | 610 optically unchanged |
| 2 | 100 | 4.8 | 430 lightly rough surface |
| 3 | 200 | 4.9 | 450 same as 2 |
| 4 | 300 | 6.2 | 700 same as 2 |
| 5 | 400 | 18.9 | 3200 Experiment stops Surface inactive |

The second control electrode was also connected as an anode. The cathode of the same construction showed a slight increase in ohmic resistance and working potential.

Reference to the inner one of the layers as having a "high stability" means that the inner layer is stable when exposed to the electrolyte, i.e. does not change its structure due to action of the electrolyte.

I claim:

1. In a polarizable electrode in an electrolyte comprising a highly conductive electrical conductor, which is covered by an electrically conductive plastic sheath cover, the improvement wherein said sheath cover comprises at least two different layers including an inner predominantly nonpolar electrically conductive polymer layer directly adjacent said electrical conductor and an outer predominantly polar electrically conductive polyer, layer, said inner layer being composed of an electrically conductive plastic having a high stability to said electrolyte, said outer layer being in contact with said electrolyte and being composed of a different electrically conductive plastic fashioned to undergo a structural change by action of said electrolyte in the form of an increase in porosity, volume and surface area, and said inner and outer layers each to a thickness of from 0.2 to 5 mm circumferentially completely surrounding said conductor.

2. The improvement defined in claim 1 wherein said electrically conductive plastic forming said inner layer is at least partially constituted of polyethylene, polypropylene or a mixture thereof.

3. The improvement defined in claim 2 wherein said outer layer is at least partially comprised of ethylene vinyl acetate, hard or soft polyvinyl chloride, acrylonitrilebutadiene-styrene terpolymer, chlorinated polyethylene, polyurethane, nitrile rubber, styrene-butadiene rubber, halogen elastomer or a mixture thereof.

4. The improvement defined in claim 3 wherein carbon black, graphite powder, carbon fiber, graphite fiber, or a mixture thereof are mixed with a polymer forming at least one of said layers to impart electrical conductivity thereto.

5. The improvement according to claim 4 wherein said electrically conductive plastic contains between 5 and 70 Vol. % of said carbon black, graphite powder, carbon fiber, graphite fiber or said mixture thereof.

6. The improvement defined in claim 5 wherein said electrically conductive plastic material comprises about 20 Vol. % of said carbon black, graphite powder carbon fiber, graphite fiber or mixture thereof.

7. The improvement defined in claim 1 wherein said electrically conductive plastic forming said layers at least partially comprises intrinsically conducting polymers to impart electrically conductivity thereto.

8. The improvement defined in claim 1 wherein said highly conductive conductor has a circular cross section.

9. The improvement defined in claim 1 wherein said highly conductive conductor comprises a flat body in a form of a metal mesh screen.

10. The improvement defined in claim 1 wherein said layers made from said electrically conductive plastic are applied to said electrically highly conductive conductor by extrusion injection molding or hot pressing.

11. The improvement defined in claim 1 wherein said inner layer is a nonporous layer.

12. The improvement defined in claim 1 wherein said outer layer is a porous layer.

13. A polarizable electrode in an electrolyte comprising:
a highly conductive conductor comprising a metal or carbon fibers; and
an inner predominantly nonpolar layer immediately adjacent said conductor and an outer predominantly polar layer adjacent said electrolyte each of which to a thickness of from 0.2 to 5 mm completely circumferentially encloses said highly conductive conductor, said inner layer at least partially comprising polyethylene, polypropylene or a mixture of said polyethylene and said polypropylene and said outer layer at least partially comprising ethylene vinyl acetate, hard or soft polyvinyl chloride, acrylonitrile-butadiene-styrene terpolymer, chlorinated polyethylene, polyurethane, nitrile rubber, styrene-butadiene rubber, halogen elastomer or a mixture thereof, both said inner and said outer layer also containing between 5 and 70 Vol. % of carbon black, graphite powder, carbon fiber, graphite fiber or a mixture thereof.

* * * * *